May 15, 1956 F. KESSLER 2,745,903

SIGNALING SYSTEM

Filed May 10, 1952 6 Sheets-Sheet 1

INVENTOR
FRANK KESSLER
BY T. L. Bowes
ATTORNEY

INVENTOR
FRANK KESSLER
BY
T. L. Bowes
ATTORNEY

INVENTOR
FRANK KESSLER
BY T. L. Bowes
ATTORNEY

May 15, 1956 F. KESSLER 2,745,903

SIGNALING SYSTEM

Filed May 10, 1952 6 Sheets-Sheet 4

INVENTOR
FRANK KESSLER
BY T. L. Bowes
ATTORNEY

May 15, 1956 F. KESSLER 2,745,903

SIGNALING SYSTEM

Filed May 10, 1952 6 Sheets-Sheet 5

INVENTOR
FRANK KESSLER
BY T. L. Bowes
ATTORNEY

SIGNALING SYSTEM

Filed May 10, 1952 6 Sheets-Sheet 6

INVENTOR
FRANK KESSLER
BY
T. L. Bowes
ATTORNEY

United States Patent Office 2,745,903
Patented May 15, 1956

2,745,903

SIGNALING SYSTEM

Frank Kessler, Los Angeles, Calif., assignor, by mesne assignments, to General Dynamics Corporation, a corporation of Delaware Application May 10, 1952, Serial No. 287,094

9 Claims. (Cl. 179—6.3)

This invention relates to signaling systems and particularly to minute current signaling in telecommunication systems.

The object of the invention is simplicity of operation and economy, particularly in physical plant for toll line or interoffice equipment.

The invention resides in certain improvements in circuits used for toll and long distance working, known as CLR trunks, circuits over which a subscriber may establish a connection to a toll operator in a distant exchange and which the toll operator may use either to record the information forming the basis of a long distance call which she will later establish over other circuits or to complete immediately the connection to the wanted substation. The invention is characterized by the use of a two wire communication channel interconnecting a trunk line circuit arrangement in a branch office and a trunk line circuit arrangement in a main office terminating in an incoming call arrangement before a toll operator. Signaling arrangements whereby a plurality of functions in both directions are controlled or executed over the two wire link in this trunk line are provided, including a signal in the main office that the trunk has been seized in the branch office, a signal in the branch office that the operator in the main office has answered the call and resulting in the automatic refunding of the coin which the subscriber has used to establish the connection to the toll operator, a signal in the main office that the subscriber in the branch office wishes to attract the attention of the operator, a signal from the operator in the main office to cause coin collect potential or coin return potential to be applied to the calling line at the branch office, a signal to the main office that the subscriber has hung up and a signal from the main office to the branch office that the operator has pulled her cord and released the connection and which signal results in the release of the switch train in the branch office.

A feature of the invention is the use of a pair of differential duplex signaling circuits composited on the two wires of a telecommunication channel controlling at each end a network of circuits whereby combinational operation thereof may be utilized to transmit a plurality of signals between the branch and main office terminations of the trunk line. The operation of these four relays, two at one end of a two wire trunk and two at the other end in different permutations and combinations constitute the transmission in each direction of a plurality of items of information covering the establishment of a plurality of operational conditions and executing a plurality of control operations.

Another feature of the invention is a trunk line originating in one office where it may be seized over a train of switches and extending over a simple two wire channel to a second office where it terminates in an answering appearance in a manually operated switchboard. In accordance with this feature, various potentials or characteristic electrical conditions are applied to the calling line in the said first office under control of an operator at the distant office by characteristic signals transmitted over the said two wire line. In accordance with this feature the toll operator distantly applies various signaling currents to the calling line such as ringing current, coin collect and coin refund current.

Another feature of the invention is a combination of a two wire line, each line having a relay at each end thereof controllable from the other end thereof and a network of circuits jointly controlled at each end thereof by the two relays thereat whereby a plurality of items of information may be transmitted over said two wire line in each direction.

Another feature of the invention is a means for transmitting a signal to the calling subscriber indicating that the toll operator in a distant office is being rung and means controlled over the derived circuits of the two wire trunk responsive to the answer of the toll operator for cutting off this signal. Simply stated, a source of ringback tone is connected to the calling line when the CLR trunk is first seized and is then cut off through the operation of the duplex relays at that end when the operator answers at the distant end.

Another feature is the means for reversing the line back towards the calling subscriber and for transiently connecting coin refund thereto in response to the answer of the toll operator and under control of the said duplex relays which are operated from the distant end of the trunk. Thus it will appear that a multiplicity of operations at each end of the trunk are carried out under control of various signals transmitted over the derived circuits of the two wire link of the trunk.

Other features will appear hereinafter.

The drawings consist of six sheets having seven figures, as follows.

Figure 2:
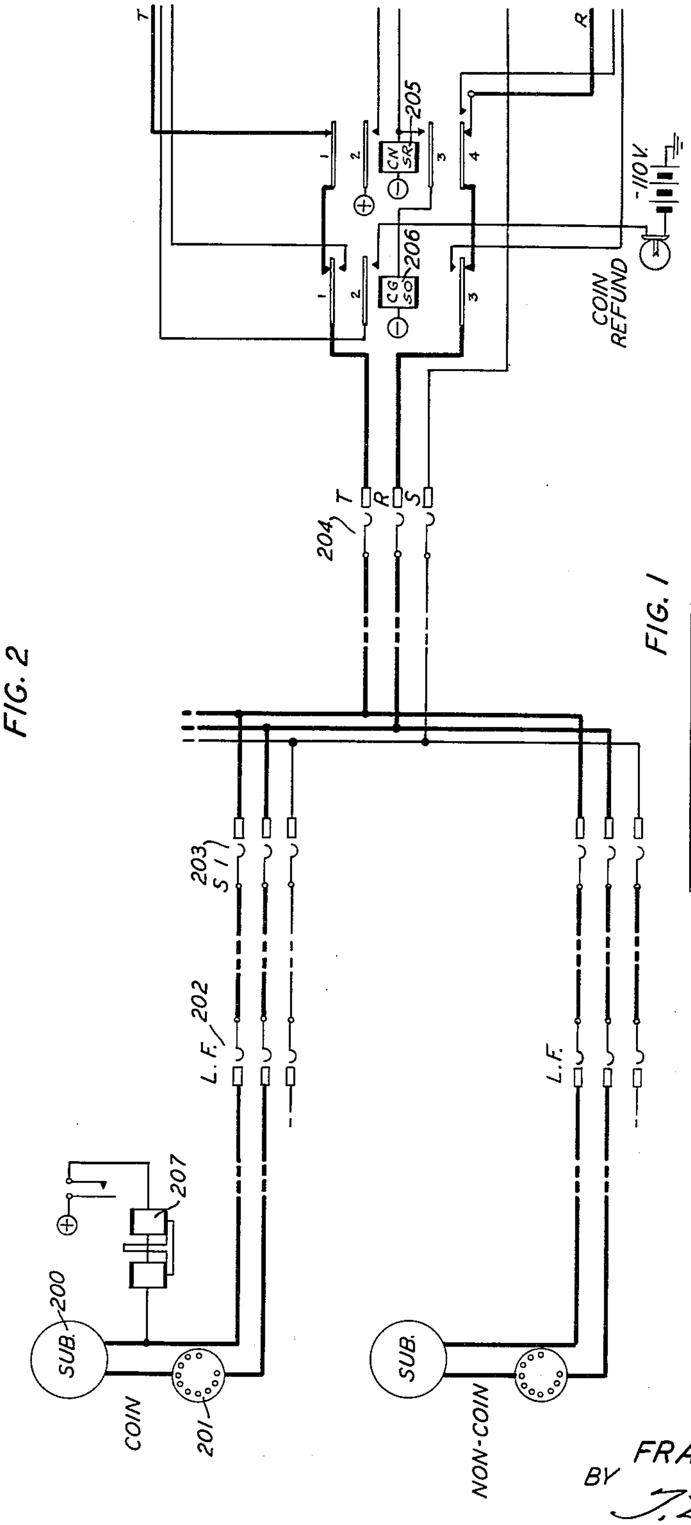
Fig. 2 is a schematic circuit diagram having an indication of two types of calling subscribers' lines, the switch trains for establishing connections therefrom to a completing and recording trunk leading to an operator's position together with a portion of the CLR trunk in a branch office.
Figure 1:
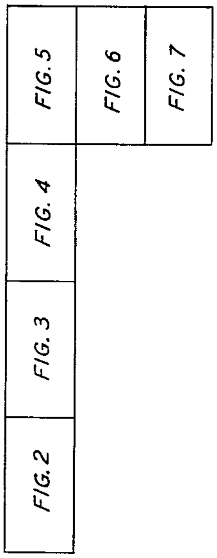
Fig. 1 is a block diagram showing how Figs. 2–7 inclusive may be placed to provide a schematic circuit diagram of the present invention and the operator's cord circuit cooperating therewith.

The purpose of the CLR trunk circuit is to provide access to a toll board from a prepay pay station in a branch office.

It may be assumed that a subscriber at substation 200 through the use of the convention dial 201 thereat may establish a connection by conventional means over a line finder 202, a selector 203 and a selector 204, which selectors are dialed into cooperative relationship with the trunk circuit leading to the toll board. When this circuit is seized the CB calling bridge relay 300 is operated over a path from ground, the upper winding of the CB relay, the upper left winding of the repeating coil 301, the armature 2 and back contact of the LO relay 302, the back contact and armature 1 of the CN relay 205, the back contact and armature 1 of the CG relay 206, the tip of the line through the bridge established at the substation 200, the ring of the line, armature 3 and back contact of the CG relay 206, armature 4 and back contact of the CN relay 205, the back contact and armature 8 of the LO relay 302, the lower left winding of the repeating coil 301, the lower winding of the CB relay 300 to battery. The CB relay responds in this circuit and causes the operation of the RD first slow relay 303, from battery, the RD relay 303, front contact and armature 2 of the CB relay 300 to ground. Operation of the RD relay closes a circuit to operate the SR relay 400 and the SR–1 relay 401 at the distant main office. The RD relay also places ground on the sleeve lead 304 and the start lead 305, closes a circuit from the source of ringback tone 306 and prepares part of a circuit to transmit coin refund battery to the ring side of the line.

The operating path for the SR relay 400 may be traced from battery, front contact and armature 4 of the RD relay 303, front contact and armature 3 of the CB relay 300, the left hand winding of the SR–2 relay 307, the adjustable resistor 308, the upper right winding of the repeating coil 301, the tip of the line leading from the branch office to the main office, the upper left hand winding of the repeating coil 402, the right hand winding of the SR relay 400, armature 1 and back contact of the TC relay 403, the armature 1 and back contact of the CC relay 404, armature 1 and back contact of the SL–1 relay 405 to ground. The operating path for the SR–1 relay 401 may be traced from battery, the front contact and armature 4 of the RD relay 303, the front contact and armature 3 of the CB relay 300, the left hand winding of the SR–3 relay 309, the adjustable resistor 310, the lower right winding of the repeating coil 301, thence over the ring of the line from the branch office to the main office, the lower left winding of the repeating coil 402, the right hand winding of the SR–1 relay 401, the armature 1 and back contact of the CR relay 406, the armature 1 and back contact of the SL–1 relay 405 to ground. The SR, SR–1, SR–2 and SR–3 relays are differentially wound and consequently the SR–2 relay 307 and the SR–3 relay 309 do not become energized in this circuit, but the SR relay 400 and the SR–1 relay 401 do respond.

Figure 3:
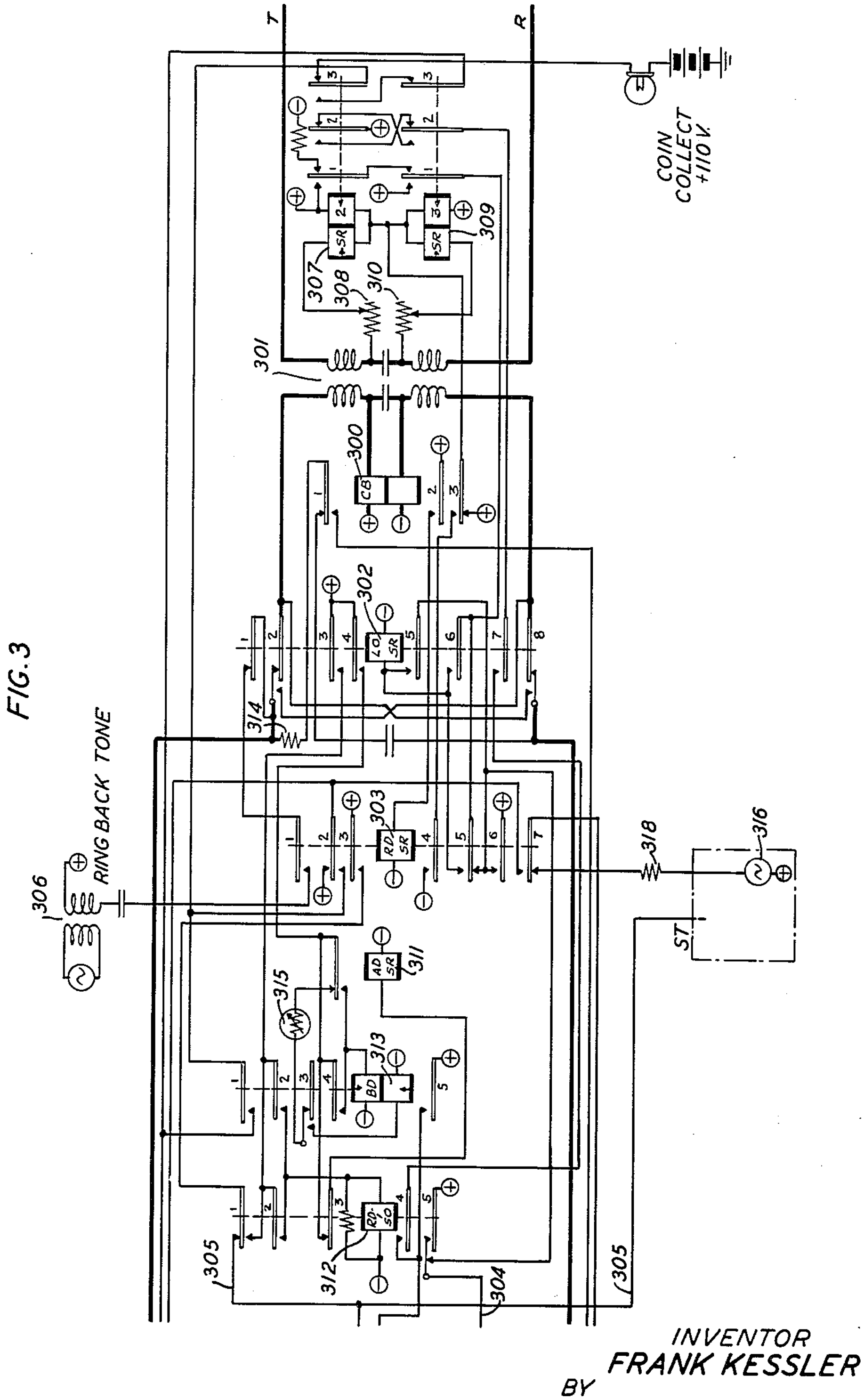
Fig. 3 is a schematic circuit diagram showing the remainder of the portion of the CLR trunk in the branch office.
Figure 4:
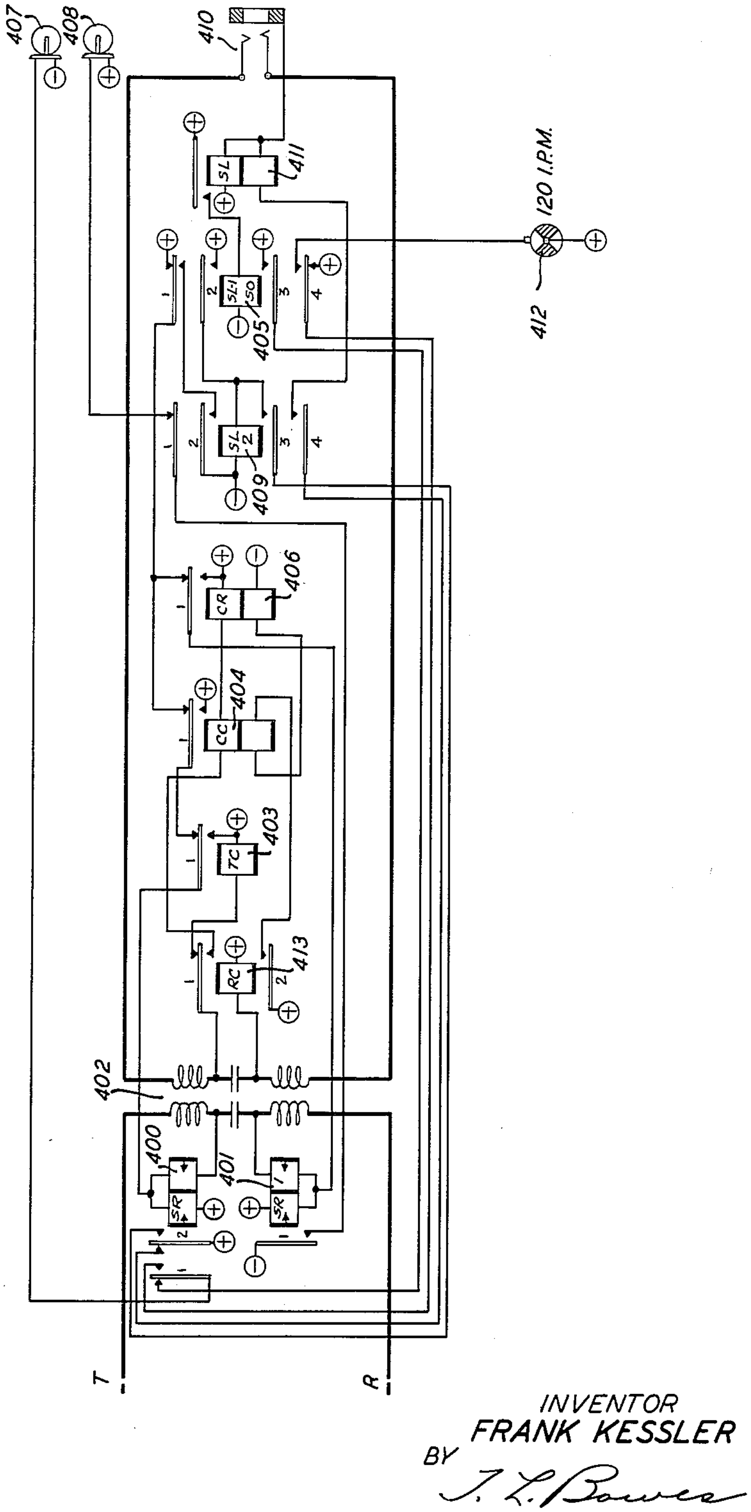
Fig. 4 is a schematic circuit diagram of that branch of the CLR trunk in the main office terminating in an appearance in a toll board.

Attention is particularly directed to the arrangement of the two wire circuit used for interconnecting the two portions of the CLR trunk, that portion shown in Figs. 2 and 3, which is located in a branch office, and that portion shown in Fig. 4 which is located in the main office where it terminates in a jack and call lamp in a toll operator's board. Here a differential duplex circuit is composited on each physical circuit of the telecommunication channel by which signals may be transmitted in each direction. By way of example, the SR relay 400 and the SR–2 relay 307 interconnected over the tip conductor comprise a differential duplex circuit. Each relay has two windings, differentially wound, one of which is permanently grounded and the other of which is in series with the corresponding winding of the distant relay. The junction point of each relay is normally grounded, but extends to a switching point where the ground connection may be changed to a battery connection. When such a change is made, then the near relay is unaffected but the distant relay responds. Signals may thus be transmitted from each end of the circuit to the other end either separately or simultaneously.

Operation of the SR relay 400 closes a circuit from ground, the armature 4 and back contact of the SL–1 relay 405, the front contact and armature 1 of the SR relay 400 to light the monitor lamp 407.

Operation of the SR–1 relay 401 closes a circuit to light the answer lamp 408 from battery, armature 1 and front contact of the SR–1 relay 401, armature 1 and back contact of the SL–2 relay 409, the answer lamp 408 to ground.

In response to the lighting of this lamp the operator answers the incoming call and inserts the rear plug 500 of one of the cords at her disposal into the jack 410. Thereupon a circuit is established from battery through the resistance comprising the resistor 501 and the cord snpervisory lamp 502, the normal contacts of armature 8 of the OC relay 503, the sleeve of the plug 500, the sleeve of the jack 410, through the upper winding of the SL relay 411, thereby operating this later relay. Operation of the SL relay 411 closes an obvious operating circuit for the SL–1 relay 405. Operation of the SL–1 relay closes an obvious operating circuit for the SL–2 relay 409 and transfers the ground for operating the monitor lamp 407 from a steady ground connection to an interrupted ground connection by way of the interruptor 412. The operation of the SL–1 relay 405 by the movement of its armature 1 also removes ground from the junction point of the SR relay 400 and the SR–1 relay 401 and substitutes battery therefor from the armature 2 and front contact of the SL–2 relay 409.

Operation of the SL–2 relay opens the circuit to the answer lamp 408 and closes the circuit for forwarding battery through the windings of the SR relay 400 and SR–1 relay 401 which cause the operation of the distant SR–2 relay 307 and SR–3 relay 309. The SR relay 400 and the SR–1 relay 401 remain operated through their permanently grounded left hand windings.

Operation of the SR–3 relay 309 closes an operating circuit to the LO relay 302 which may be traced from ground, front contact and armature 1 of the SR–3 relay 309, armature 5 and front contact of the RD relay 303, winding of the LO relay 302 to battery. The LO relay in operating closes a locking circuit for itself from ground, armature 6 and front contact of the RD relay 303, armature 5 and front contact of the LO relay 302 to battery. Operation of the LO relay disconnects the source of ring back tone 306 from the tip of the line and through its armatures 2 and 8 reverses the tip and ring leads to prepare the circuit for coin return. The operation of the LO relay also closes an operating circuit to the AD relay 311 in a circuit which may be traced from battery, the winding of the AD relay 311, armature 3 and back contact of the RD–1 relay 312, front contact and armature 4 of the LO relay 302 to ground. Operation of the AD relay 311 closes an operating circuit for the BD relay 313 from ground, armature 4 and front contact of the LO relay 302, armature and front contact of the AD relay 311 and thence through the upper winding of the BD relay 313 to battery. The BD relay operates and closes a locking circuit for itself through its armature 4 and front contact.

Operation of the BD relay 313 closes a circuit to the RD–1 relay 312 which may be traced from ground, armature 3 and front contact of the LO relay 302, armature 2 and front contact of the BD relay 313, the winding of the RD–1 relay 312. The BD relay also through its armature 5 closes an obvious circuit for the operation of the CN relay 205. Through its front contact and armature 1 the BD relay partially closes a circuit for a coin refund operation. The RD–1 relay 312 does not operate at this instant due to its slow operating characteristics.

The operation of the CN relay 205 closes a circuit over its front contact and armature 3 to the winding of the CG relay 206. The operation of the CN relay 205 also bridges the resistor 314 across the CB relay 300 to hold it operated during certain ensuing operations. This circuit may be traced from ground, the upper winding of the CB relay 300, the upper left winding of the repeating coil 301, the front contacts of armature 8 of the LO relay 302, the front contacts of armature 4 of the CN relay 205, the front contact and armature 1 of the CB relay 300, the resistance 314, the front contacts of armature 2 of the LO relay 302, the lower left winding of the repeating coil 301 and the lower winding of the CB relay 300 to battery. The operation of the CN relay also opens the tip and ring loop to the subscriber at its armatures 1 and 4. The CG relay 206 does not operate at this instant due to its slow operating characteristics.

The RD-1 relay 312 now operates and through its armature 3 and front contact, places an alternate ground on the sleeve lead 304 leading back toward the switch train used in establishing the connection from the calling subscriber to this CLR trunk. The RD-1 relay opens the circuit for the AD relay 311 and closes a locking circuit for itself from battery through its winding, its front contact and armature 2 to the ground supplied over the front contact and armature 3 of the LO relay 302. The AD relay 311 is slow releasing and therefore does not open its contacts at this instant.

The CG relay 206 now operates and closes a circuit to connect negative 110 coin refund voltage through its front contact and armature 2, front contact and armature 1 of the BD relay 313, the front contact and armature 2 of the RD relay 303, the front contact and armature 1 of the CG relay 206 to the tip side of the calling subscriber's loop, and to the ring side of the calling subscriber's loop through the front contact and armature 7 of the RD relay 303, the front contact and armature 3 of the CG relay 206. This battery will cause the operation of the coin magnet 207 to refund the coin originally deposited by the calling subscriber.

The AD relay 311 now restores and closes a circuit from ground, armature 4 and front contact of the LO relay 302, the armature and back contact of the AD relay 311, the thermistor 315, the front contacts of armature 3 of the BD relay 313, the lower winding thereof to battery. The BD relay 313 is differentially energized but due to the characteristics of the thermistor 315 remains operated for a period of time sufficient to operate the RD-1 relay 312, the CN relay 205 and the CG relay 206, as described, and to refund the subscriber's deposited coin. When the characteristics of the thermistor 315 have sufficiently changed due to the flow of current therein, the BD relay 313 restores and opens the circuit of the CN relay 205 and the CG relay 206 allowing them to restore to normal. When the CN and CG relays restore the subscriber's loop is again placed across the line, the resistor 314 is removed from the winding of the CB relay 300 and a transmission path is now closed through the circuit.

*Recalling the operator*

If the calling party desires to recall the operator after the operator has answered, it may be accomplished by flashing the hookswitch which opens the loop of the CB relay 300 each time the hookswitch is depressed. The CB relay 300 restores each time and opens the circuit to the RD relay 303 which, however, due to its slow releasing characteristics remains operated unless the subscriber is very slow in the operation of the hookswitch. It may be noted that no harm will be caused if the calling subscriber is slow and allows the RD relay 303 to restore. The restoration of the CB relay 300 on each operation of the hookswitch changes the battery connection to the junction points of the SR-2 relay 307 and SR-3 relay 309 from battery to ground and thus causes the release of the distant SR relay 400 and SR-1 relay 401. Release of the SR relay 400 transfers the monitor lamp 407 from the flashing circuit to a steady circuit and closes a circuit to forward low resistance ground over the sleeve lead toward the operator's cord circuit, thus resignalling the operator in a manner to be more fully described hereinafter. This low resistance ground circuit may be traced from ground, armature 2 and back contact of the SR relay 400, the armature 4 and front contact of the SL-2 relay 409, the lower winding of the SL relay 411 to the sleeve of the jack 410. It may be noted that the upper winding of the SL relay 411 is of high resistance and the lower winding thereof is of low resistance.

*Reringing the calling party*

If the operator wishes to rering the calling party after such party has disconnected, she operates a ringing key which forwards resistance battery over the tip of the connected cord, from −110 volt battery, the resistance element 508, springs 3 and 4 of the rear cord ringing key 504, tip of the plug 500, tip of the jack 410 through the upper right winding of the repeating coil 402, armature 1 and back contact of the RC relay 413, the winding of the TC relay 403 to ground. Operation of the TC relay 403 now changes the battery connection to the junction point of the SR relay 400 from battery to ground and thus causes the release of the SR-2 relay 307. Release of the SR-2 relay closes an operating circuit for the CN relay 205 which may be traced from ground, armature 2 and back contact of the SR-2 relay 307, the front contact and armature 2 of the SR-3 relay 309, armature 7 and front contact of the LO relay 302, the armature 4 and front contact of the RD-1 relay 312, through the winding of the CN relay 205 to battery. Operation of the CN relay 205 opens the tip and ring loop to the calling subscriber and, through its armature 2 and front contact grounds the start lead 305 for enabling the source of ringing current. The CN relay 205 also closes an energizing circuit for the CG relay 206. The opening of the loop allows the CB relay 300 to release and, in turn, the RD relay 303 to release. Thereafter a circuit is established from a source of ringing current 316, a resistor 318, the back contact and armature 7 of the RD relay 303, the front contact and armature 3 of the CG relay 206, over the ring of the line through the loop thereof back over the tip of the line, armature 1 and front contact of the CG relay 206, armature 2 and back contact of the RD relay 303 to ground. Thus ringing current is transmitted to the calling subscriber's station.

When the operator restores her ringing key the TC relay 403 is allowed to release, whereupon the ground now connected to the junction point between the windings of the SR relay 400 is changed from ground to battery and the SR relay 307 is reoperated. Operation of the SR-2 relay 307 opens the operating circuit for the CN relay 205 and the CG relay 206. The CN relay 205 is slow releasing and does not restore its armatures until after the CG relay 206 has restored and removed the ringing current from the line. When the CN relay 205 does restore it recloses the loop to the CB relay so that this will operate as soon as the calling subscriber responds to the call.

*Coin collect*

If the operator desires to collect a coin she operates her collect key 600. This establishes a circuit from battery, the PR relay 601, springs 6 and 5 of the collect key 600, springs 4 and 5 of the coin refund key 602, the armature 3 and front contact of the RS-21 relay 603 (operated at this time) over the PR lead 604, the armature 4 and front contact of the OC relay 503 (operated at this time), the back contact and armature 4 of the DR relay 505 (not operated at this time), the springs 6 and 7 of the rear cord ringing key 504, the ring of the plug 500, the ring of the jack 410, the lower right winding of the repeating coil 402, the winding of the RC relay 413 to battery. This causes the operation of the RC relay 413. Through the operation of the RC relay 413, a circuit is established for the lower windings of the CC relay 404 and the CR relay 406 in series, but there is insufficient current in this circuit to cause the operation of either of these relays. However, a circuit is established from positive 110 volt source through the winding of the CR relay 605, the front contact and armature 2 of the PR relay 601, the springs 1 and 2 of the coin collect key 600, the springs 3 and 2 of the CR key 602, the armature 2 and front contact of the RS-21 relay 603 (operated at this time), the RT lead 606, the armature 2 and front contact of the OC relay 503 (operated at this time), the back contact and armature 2 of the DR relay 505 (not operated at this time) springs 5 and 4 of the rear cord ringing key 504, the tip of the plug 500, the tip of the jack 410, the upper right winding of the repeating coil 402, armature 1 and front contact of the RC relay 413 and thence in series through the upper winding of the CC relay 404 and the CR relay 406 to ground. The CR relay is differentially wound and hence the energization supplied in this circuit is opposed to the energization through its lower winding so that the CR relay does not respond. However, the CC relay 404 is wound in the opposite direction and hence the energization of its upper winding aids the energization of its lower winding and causes its operation. The operation of the CC relay 404 changes the battery connection to the junction of the windings of the SR relay 400 to a ground connection, whereby the SR–2 relay 307 is released. Release of the SR–2 relay 307 closes an operating circuit to the CN relay in the manner hereinbefore described so that this relay becomes operated and in turn closes an operating circuit for the CG relay 206. The operation of the CN relay 205 again places the resistor 314 across the windings of the CB relay 300 to hold it operated, opens the tip and ring of the loop and closes the said operating circuit to the CG relay. This relay, when operated, closes a circuit to forward positive 110 volt coin collect potential over the back contact and armature 3 of the SR–2 relay, the front contact and armature 2 of the RD relay 303, the front contact and armature 1 of the CG relay 206 to the tip side of the line and through the front contact and armature 7 of the RD relay 303, the front contact and armature 3 of the CG relay 206 to the ring side of the line, whereby positive 110 volts is transmitted to the calling subscriber's line to operate the coin magnet thereat to collect the deposited coin. When the coin has been collected, the operator restores her collect key 600 thus allowing the RC relay 413 and the CC relay 404 to release. Release of the CC relay 404 recloses the circuit for operating the SR–2 relay 307 so that the CN relay 205 and the CG relay 206 are released and remove the coin collect voltage from the line. The CG relay 206 releases and recloses part of the loop. Shortly thereafter the CN relay 205 releases, reclosing the tip and ring loop and removing the resistor 314 from across the windings of the CG relay 300.

*Coin refund*

If the operator desires to refund a coin, she operates her refund key 602 whereby the battery through the winding of the PR relay 601 is connected over springs 6 and 5 of the coin refund key 602, the armature 3 and front contact of the RS–21 relay 603 (now operated) and thence over the circuit previously described to cause the operation of the RC relay 413. In the same manner negative 110 volts is now connected through the winding of the RR relay 607 through the front contact and armature 1 of the PR relay 601, the springs 1 and 2 of the coin refund key 602, the armature 2 and front contact of the RS–21 relay 603 and thence over the circuit previously described through the upper windings of the CC relay 404 and the CR relay 406 to ground. In this case the CC relay 404 will not operate but the CR relay 406 will operate and hence the circuit at its armature 1 is changed from battery to ground thus causing the release of the distant SR–3 relay 309. In this case a circuit is established from ground, the armature 2 and front contact of the SR–2 relay 307, the back contact and armature 2 of the SR–3 relay 309 over the circuits hereinbefore described to cause the operation of the CN relay 205 and thereafter the CG relay 206. In this case the coin refund source of current is connected through the front contact and armature 2 of the CG relay 206, the armature 3 and back contact of the SR–3 relay 309, the front contact and armature 3 of the SR–2 relay 307 and thence over the circuits hereinbefore described to the tip and ring of the calling subscriber's loop to operate the coin magnet 207 thereat in the direction to refund the coin. When the coin has been refunded the operator restores her refund key 602 thus allowing the RC relay 314 and the CR relay 406 to restore, in turn causing the reoperation of the SR–3 relay 309 and the restoration of the circuit to its normal condition.

*Release*

When the calling party disconnects, the circuit of the CB relay 300 is opened allowing this relay to release. This allows the release of the first slow relay 303 and places ground on the composited differential duplex circuit to cause the release of the SR relay 400 and the SR–1 relay 401. When the operator disconnects, battery is removed from the sleeve lead, thus allowing the SL relay 411 to restore to normal. Release of the SL relay 411 opens the circuit for the SL–1 relay 405 and this relay restores the ground connection to the composited differential duplex circuits to cause the release of the SL–2 relay 307 and the SR–3 relay 309. Release of the SL–1 relay 405 also opens the circuit to the SL–2 relay 409 allowing it to release and removes ground from the circuit for operating the monitoring lamp 407, thus extinguishing this lamp.

Release of the SR–2 relay 307 and the SR–3 relay 309 opens the holding circuit of the LO relay 302, allowing it to release. The release of the LO relay 302 returns the tip and ring leads to normal, removes ground from the start lead 305 and opens the circuit to the RD–1 relay 312 allowing it to release. Release of the RD–1 relay removes ground from the sleeve lead 304 allowing the preceding equipment to restore.

*Recapitulation*

The following short statement is intended to give a concise description of the combinational operation of the differential duplex relays.

When the CLR trunk is seized, the SR relay 400 and the SR–1 relay 401 become energized. The SR relay lights the monitor lamp and the SR–1 relay lights the answer lamp.

When the operator answers the SR–2 relay 307 and the SR–3 relay additionally become energized so that now all four of these relays are energized. The SR–3 relay starts an automatic operation to apply coin refund potential to the calling line. Thereafter the operator is in communication with the calling subscriber.

When the calling subscriber wishes to attract the attention of the operator, he depresses his hookswitch several times. Whether this is done quickly enough to maintain the first slow relay energized or slowly enough to allow the release of this relay is immaterial. On each depression of the hookswitch the SR relay 400 and the SR–1 relay 401 release, leaving the SR–2 relay 307 and the SR–3 relay 309 energized. Under this condition the SR relay causes the monitor lamp to flash and to operate the cord supervisory lamp to attract the attention of the operator.

When the calling subscriber has hung up, the trunk is held as long as the operator does not remove her cord and the SR–2 and SR–3 relays remain operated.

When the operator wishes to rering the calling party she operates her ringing key and the SR–2 relay 307 releases, leaving at this time only the SR–3 relay 309 energized. This applies ringing current to the calling line.

When the operator wishes to collect a coin she operates her coin collect key, whereupon the SR–2 relay 307 releases leaving the other three relays energized. This applies coin collect potential to the calling line.

When the operator wishes to refund a coin she operates her coin refund key, whereupon the SR–3 relay 309 is released leaving the other three relays operated. This applies coin refund potential to the calling line.

When the calling party hangs up, the SR and the SR–1 relays release, causing the monitor lamp to flash and the cord supervisory lamp to light.

When the operator pulls out her cord, the SR–2 and SR–3 relays release and the ground is removed from the sleeve so that the switch train through which the CLR trunk was seized may be released.

*Toll operator's cord circuit*

Figure 5:
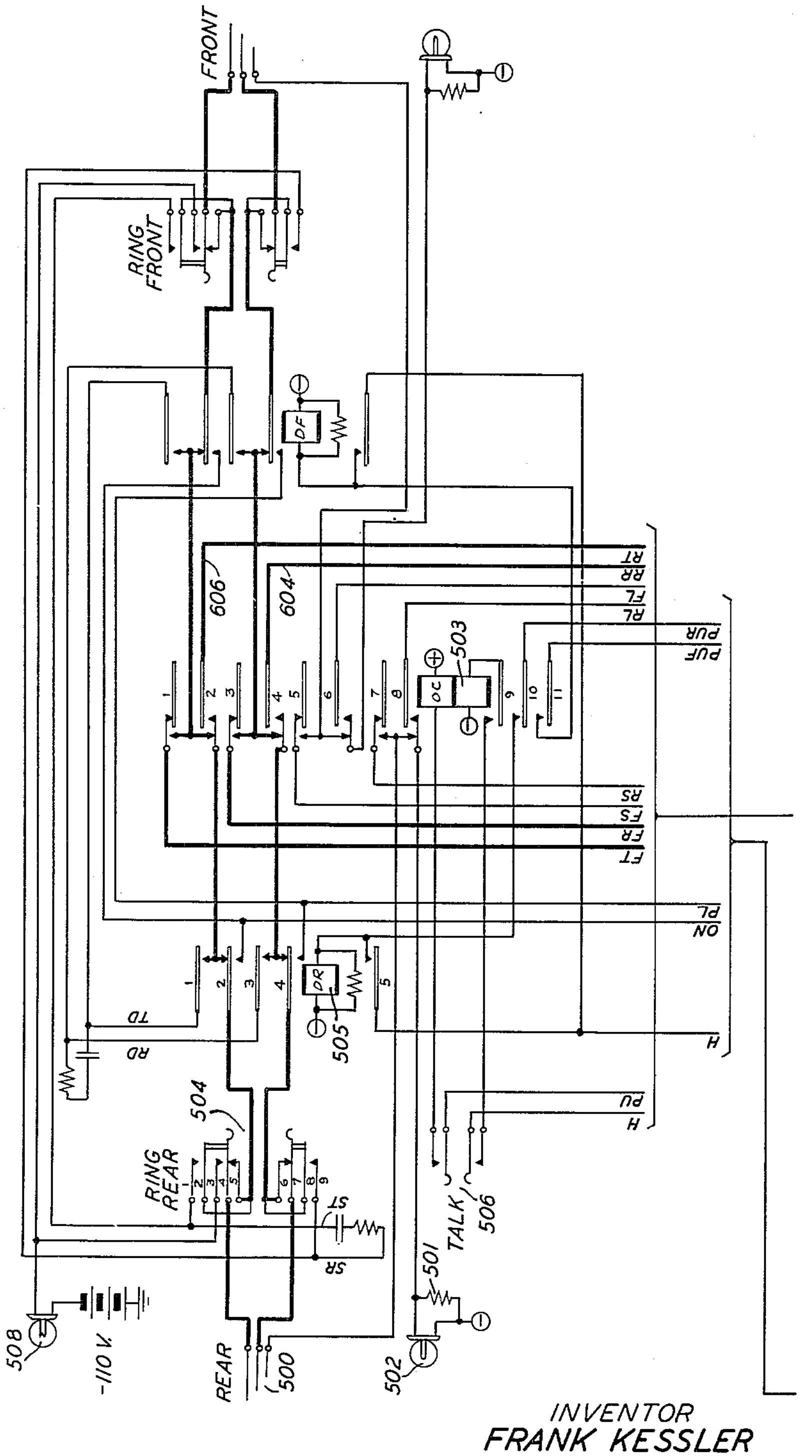
Fig. 5 is a schematic circuit diagram of a toll board cord circuit by which an operator may answer an incoming call over the CLR trunk and record the information necessary for later establishing a toll or long distance connection, or by which she may complete the connection to the called subscriber immediately.
Figure 6:
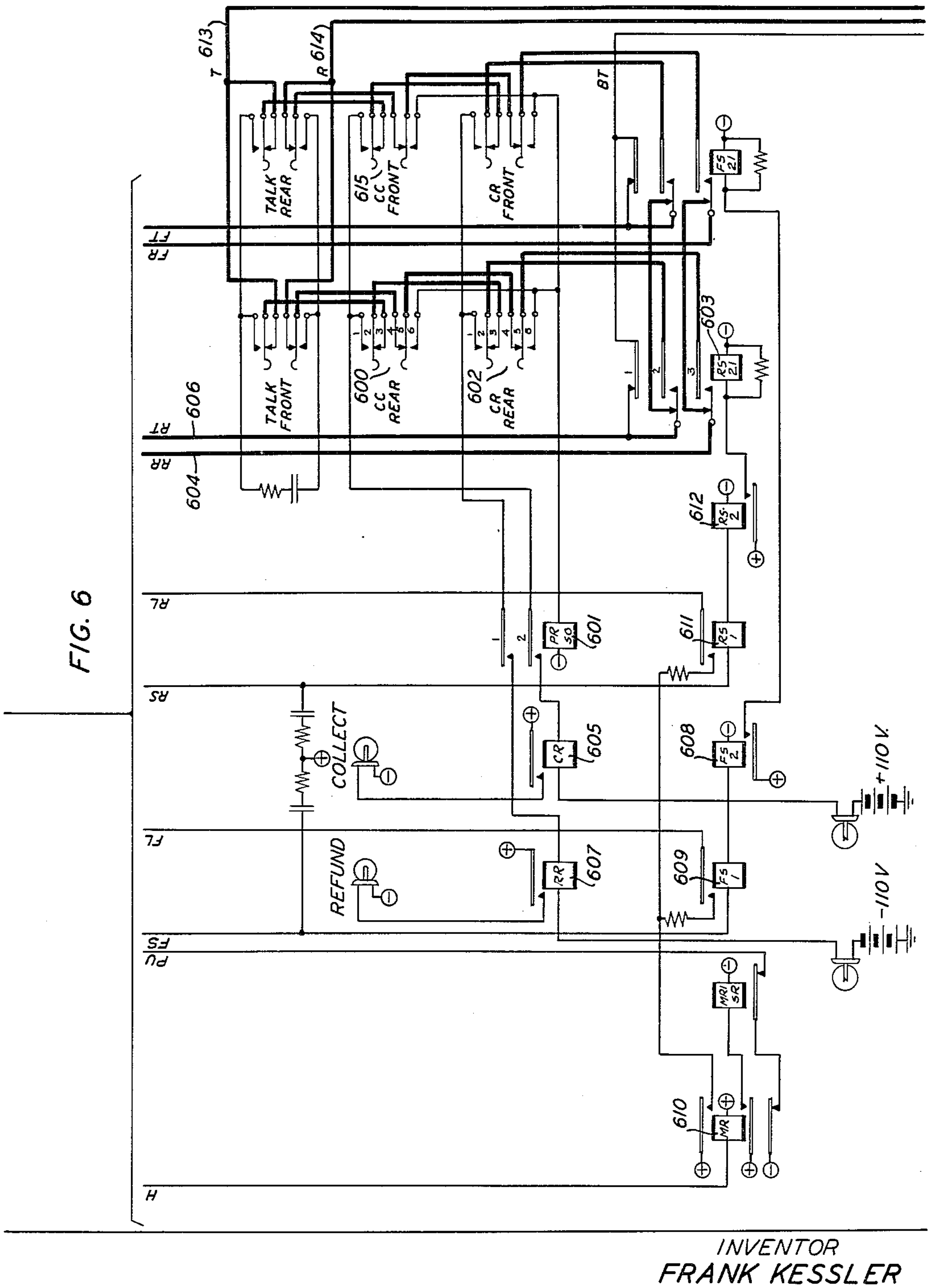
Fig. 6 is a schematic circuit diagram of the position circuit common to the various cord circuits at the toll operator's position.
Figure 7:
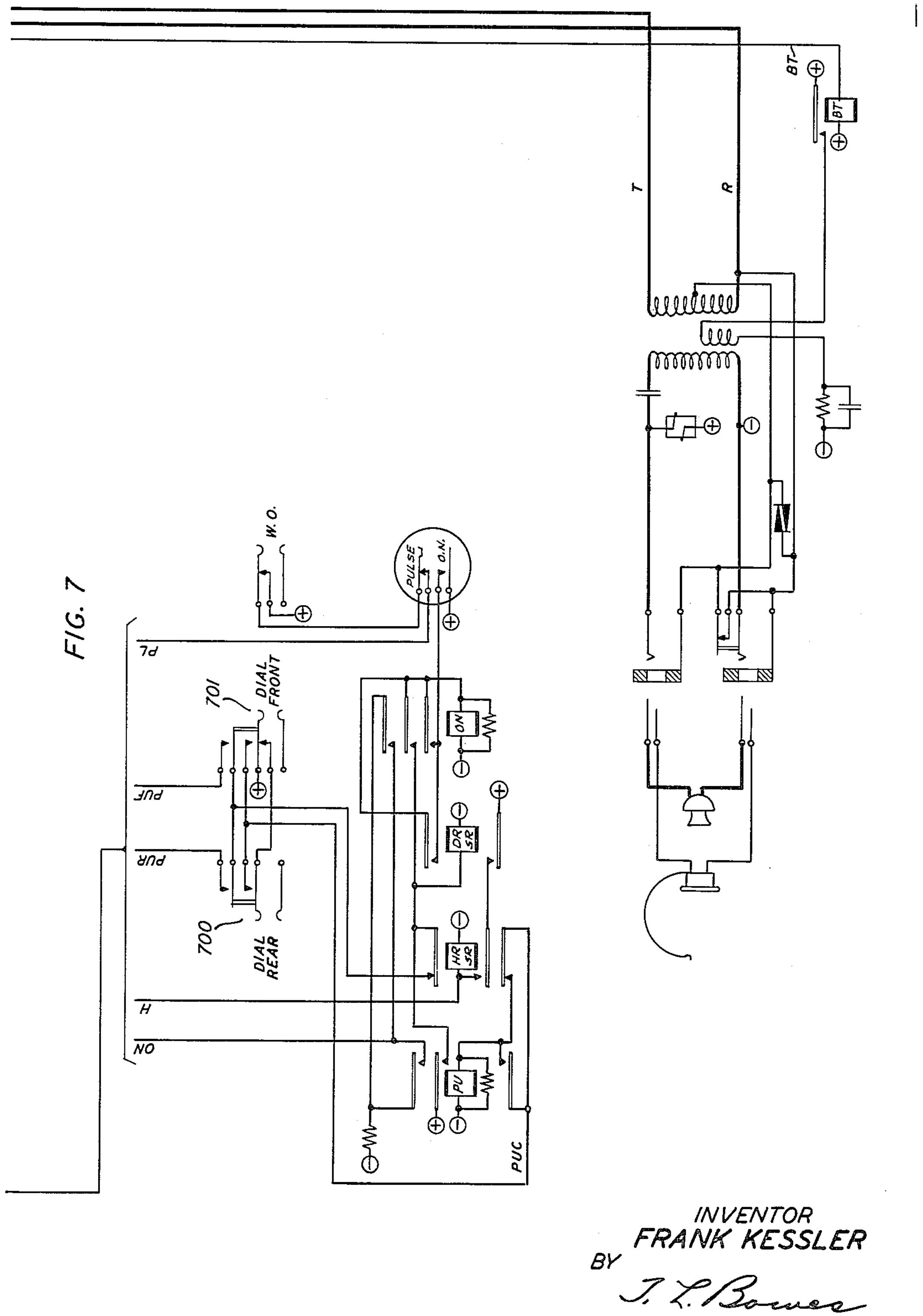
Fig. 7 is a schematic circuit diagram showing the common dialing circuit and the common operator's circuit cooperatively associated with the cord circuit of Fig. 5.

The cord circuit by which an operator may answer an incoming call on the CLR trunk and either record the information necessary for establishing a toll or long distance call or immediately complete such connection is shown in Figs. 5, 6 and 7. Fig. 5 shows the cord circuit itself, Fig. 6 shows the position circuit and Fig. 7 shows the dialing and operator's circuits.

The principal functions of the cord circuit are to provide a transmission path between trunks and between the toll operator and the trunks, to provide supervision, to provide ringing control on the front and rear cords, to provide dialing on the front and rear cords and, lastly, to provide a means for monitoring.

To answer an incoming call the operator inserts the plug 500 into the jack associated with the calling lamp 408 and operates the talk key 506, thus closing a circuit for the OC relay 503. This establishes a circuit from battery, the winding of the FS–2 relay 608, the winding of the FS–1 relay 609, the PU lead, the upper contacts of the talk key 506 through the upper winding of the OC relay 503. This will cause the operation of the armature 9 of the OC relay 503 (a conventional two step relay) and establish a circuit through the lower winding of the OC relay 503, its armature 9 and front contact, the lower contacts of the talk key 506, over the H lead, through the winding of the MR relay 610 to ground. This circuit completely operates the OC relay 503 so that a circuit is now closed from the tip and ring leads from the rear plug 500 to the RR lead 604 and the RT lead 606 leading into the position circuit whereby access to the common operating keys therein may be had. Operation of the OC relay 503 also closes a circuit from the sleeve of the rear plug 500 through the front contact and armature 7 of the OC relay to the RS lead and thence through the RS–1 relay 611 and the RS–2 relay 612 to battery. The RS–2 relay 612 will respond to the high resistance sleeve connection through the upper winding of the SL relay 411 thereby causing the operation of the RS–21 relay 603, whereby the RR and RT leads 604 and 606 respectively are connected through the contacts of the common keys, such as the coin refund key 602 and the coin collect key 600 to the tip and ring conductors 613 and 614 respectively leading to the operator's set shown in Fig. 7. Conversation may now commence.

It may be noted that each cord circuit has but three individual keys, such as the rear ringing key 504, a similar front ringing key and the talk key 506. All other keys are common thereto, such as the coin collect key 600 for the rear cord and a similar coin collect key 615 for the front cord. Similarly there is a common dial key 700 for the rear cord and a dial key 701 for the front cord. By operating the individual talk key 506, the operator may associate her common apparatus with this particular cord.

It is believed that the operations and functions of this apparatus will be abundantly clear to those skilled in the art.

What is claimed is:

1. In a telecommunication system, a trunk line having a circuit network and terminals over which it may be seized in one office and a circuit network and answering terminals in another office, a two wire link between said circuit networks, a pair of relays at each end of said two wire link operable from the other end thereof, said circuit networks at each end of said two wire link being differently controlled by different permutations of operated and non-operated said relays.

2. In a telecommunication system, a trunk line having a circuit network and terminals over which it may be seized in one office and a circuit network and answering terminals in another office, a two wire link between said circuit networks, a differential duplex circuit composited on each said wire of said link, said circuit networks at each end of said two wire link being differently controlled by permutated operations of said differential duplex circuits whereby a plurality of control operations of said trunk in each direction may be carried out over said two wire link.

3. In a telecommunication system, a trunk line having a circuit network and terminals over which it may be seized in one office and a circuit network and answering terminals in another office, a two wire link between said circuit networks, a differential duplex circuit composited on each said wire of said link, said circuit networks at each end of said two wire link being for translating permutated operations of said differential duplex circuits into a number of control operations of said trunk at each end thereof greater than the number of wires in said link.

4. In a telecommunication system, a trunk line having a circuit network and outgoing terminals in one office and a circuit network and incoming terminals in another office, a two wire link between said distantly located circuit networks, a pair of relays at each end of said two wire link operable separately and in different combinations from the other end thereof, a plurality of different sources of signaling current at said outgoing end, greater in number than the number of wires in said link and means controlled by permutated operations of said relays for applying said sources of current to the outgoing terminals of said trunk.

5. In a telecommunication system, a CLR trunk line having a circuit network and outgoing terminals in one office and a circuit network and incoming terminals in another office, a two wire link between said distantly located circuit networks, a relay at each end of each of said two wires, each said relay being operable from the other end of said wires, means included in said network at said incoming end operable by said relays at the said incoming end for signaling the seizure of said outgoing end, for signaling the intermittent abandonment of a connection established to said outgoing terminals and for signaling the permanent abandonment of a connection established to said outgoing terminals and means included in said network at said outgoing end operable by said relays at said outgoing end for connecting signal tone, ringing current, coin collect current and coin refund current to said outgoing terminals.

6. In a telecommunication system, a one way trunk line having a circuit network and outgoing terminals in one office, a circuit network and incoming terminals in another office and a two wire link between said networks, a duplex circuit composited on each wire of said link, an operator's cord circuit for making connection to said trunk line by way of said incoming terminals, coin collect and coin refund batteries associated with said cord circuit and means in said cord circuit for selectively transmitting currents from said batteries into the said network at the said incoming end of said trunk, coin collect and coin refund batteries associated with said circuit network at said outgoing terminal end of said trunk, and means included in said network at said incoming end responsive to the application of said coin collect and coin refund batteries from said cord circuit to said incoming terminal circuit and controlled over said duplex circuits for applying said coin collect and coin refund batteries at said outgoing end to said outgoing terminals.

7. In a telecommunication system, a one way trunk line having a circuit network and outgoing terminals in one office, a circuit network and incoming terminals in another office and a two wire link between said networks, a duplex circuit composited on each wire of said link, each said duplex circuit having a relay at each end thereof operable over said circuit independent of the other, a source of ringback tone associated with said outgoing terminal network normally connected to said outgoing terminals whereby ringback tone is transmitted to a calling subscriber upon seizure of said outgoing terminals, a source of coin refund battery and a switch holding potential associated with said outgoing terminal network, means including said duplex circuit relays responsive to the seizure of said outgoing terminals and controlled over said duplex circuits for controlling said incoming terminals to call in an operator, means including said duplex circuit relays responsive to the seizure of said incoming terminals by an operator and controlled over said duplex circuits for cutting off said ringback tone, reversing the line to the calling subscriber, transiently applying said coin refund battery to said outgoing terminals for transmission to a calling line and for applying said switch holding potential to said outgoing terminals.

8. In a telecommunication system, a one way trunk line having a circuit network and tip, ring and sleeve outgoing terminals in one office, a circuit network and tip, ring, sleeve and lamp incoming terminals in another office and a two wire link between said networks, a duplex circuit composited on each wire of said link, each said duplex circuit having a relay at each end thereof operable over said circuit independent of the other, a source of ringback tone associated with said outgoing terminal network normally connected to said tip outgoing terminal whereby ringback tone is transmitted to a calling subscriber upon seizure of said outgoing terminals, a source of coin refund battery and a switch holding potential associated with said outgoing terminal network, means including said duplex circuit relays responsive to the seizure of said outgoing terminals and controlled over said duplex circuits for enabling said lamp incoming terminal to call in an operator, means including said duplex circuit relays responsive to the seizure of said incoming terminals by an operator and controlled over said duplex circuits for cutting off said ringback tone, reversing said tip and ring connections to the calling subscriber, transiently applying said coin refund battery to both said tip and ring outgoing terminals and applying said switch holding potential to said sleeve outgoing terminal.

9. In a telecommunication system, a trunk line having a circuit network and terminals over which it may be seized in one office and a circuit network and answering terminals in another office, a two wire link between said circuit networks, a duplex circuit composited on each wire of said two wire link, each said duplex circuit having a relay at each end thereof operable over said circuit independent of the other, said circuit network at each end of said two wire link including said duplex relays thereat, a first portion of said circuit network being controlled to perform a first function individual to said trunk by the first of said duplex circuit relays, a second portion of said circuit network being controlled to perform a second function individual to said trunk by the second of said duplex circuit relays and a third portion of said circuit network being controlled to perform a third function jointly by the said first and said second of said duplex circuit relays.

References Cited in the file of this patent

UNITED STATES PATENTS

| | | |
|---|---|---|
| 976,961 | Webster | Nov. 29, 1910 |
| 2,076,656 | Lomax | Apr. 13, 1937 |
| 2,248,955 | Baughman | July 15, 1941 |
| 2,376,275 | Rhoads | May 15, 1945 |
| 2,558,571 | Lamberty | June 26, 1951 |
| 2,595,106 | Scudder | Apr. 29, 1952 |